United States Patent [19]

Arimitsu

[11] Patent Number: 4,762,206
[45] Date of Patent: Aug. 9, 1988

[54] DISC BRAKE

[75] Inventor: Satoshi Arimitsu, Yokosuka, Japan

[73] Assignee: Nippon Air Brake Co., Ltd., Kobe, Japan

[21] Appl. No.: 930,738

[22] Filed: Nov. 13, 1986

[30] Foreign Application Priority Data

Nov. 15, 1985 [JP] Japan .......................... 60-175839[U]
Nov. 19, 1985 [JP] Japan .......................... 60-178863[U]

[51] Int. Cl.⁴ ........................ F16D 65/14; F16D 55/00
[52] U.S. Cl. .............................. 188/73.45; 188/73.31
[58] Field of Search ............... 188/73.31, 73.44, 73.45; 277/212 FB, 183, 166; 464/175, 173; 403/50, 51

[56] References Cited

U.S. PATENT DOCUMENTS 3,805,925  4/1974  Schoenhenz ............... 188/73.45
4,469,337  9/1984  Yokoi et al. ............... 188/73.31 X

FOREIGN PATENT DOCUMENTS 2078884  1/1982  United Kingdom ............. 188/73.45

Primary Examiner—Andres Kashnikow
Assistant Examiner—Richard Potosnak
Attorney, Agent, or Firm—Kane, Dalsimer, Sullivan, Kurucz, Levy, Eisele and Richard

[57] ABSTRACT

A disc brake includes a caliper movable relative a mounting bracket to press a pair of friction pads against opposite sides of a disc to apply a braking action. A tubular sleeve slidably extends through a guide hole formed through one either caliper or the mounting bracket in the axial direction of the disc. A bolt extends through the sleeve and is threaded into a threaded hole formed in a mounting surface of the other of the caliper and the mounting bracket. First and second retainer rings are mounted on the bolt and clamped respectively between a bolt head and one end of the sleeve and between the mounting surface and the other end of the sleeve. First and second tubular elastic boots covering the opposite end portions of the sleeve extend outward from said guide hole, respectively. One end of the first boot is secured to the first retainer ring while the other end is secured to the one of the caliper and the bracket. One end of the second boot is secured to the second retainer ring while the other end is secured to the one of the caliper and the bracket. The one ends of the first and second boots are elastically held in contact with the bolt head and the mounting surface.

7 Claims, 3 Drawing Sheets

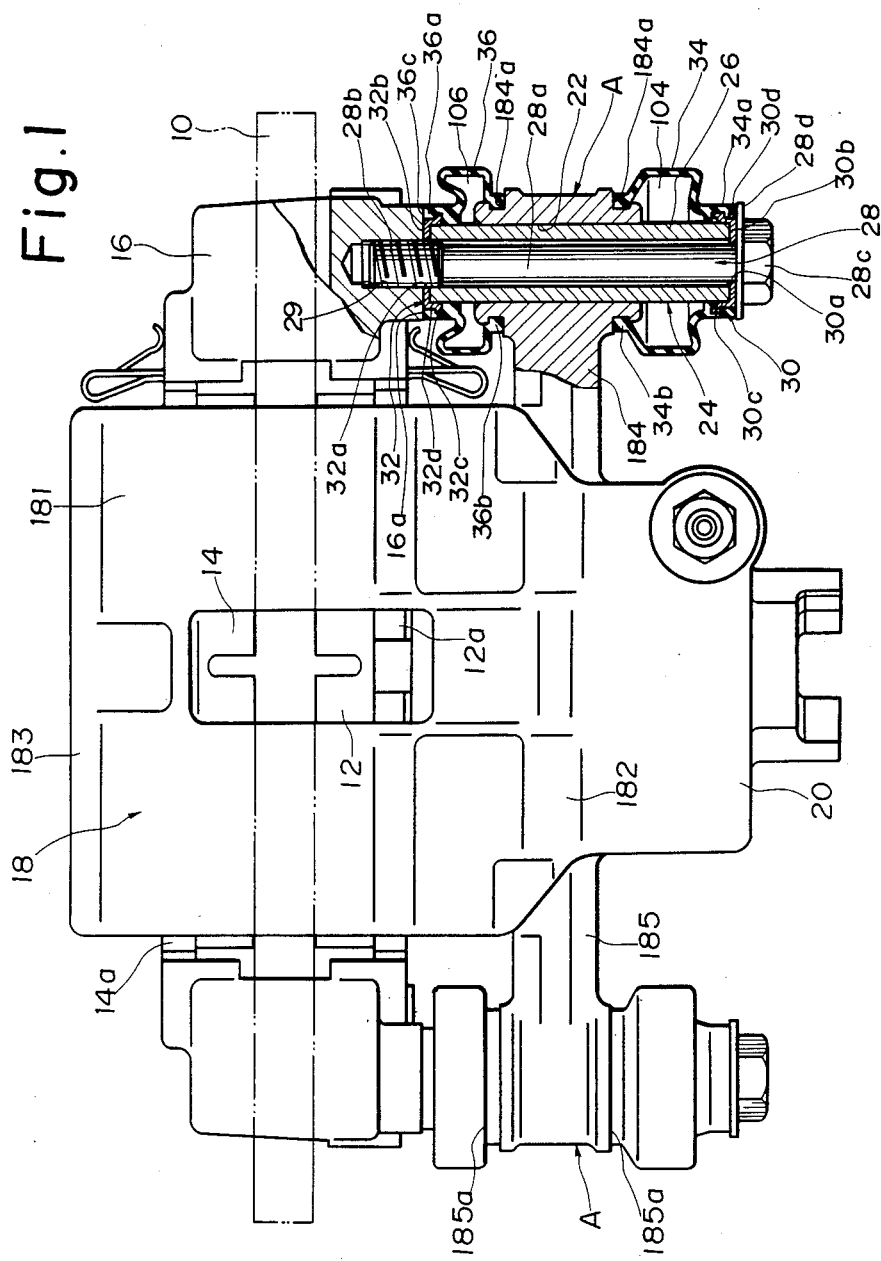

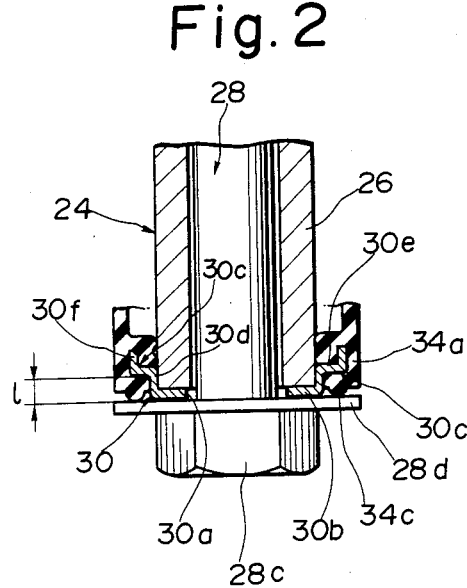
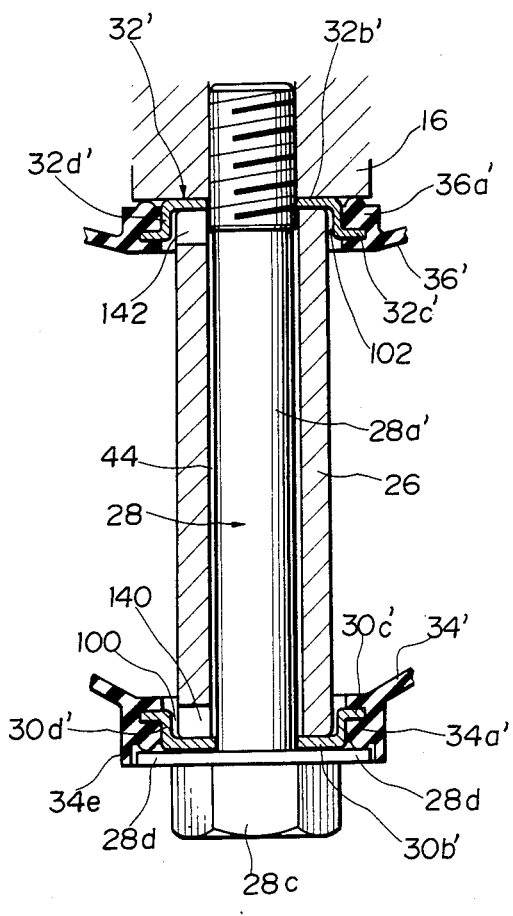

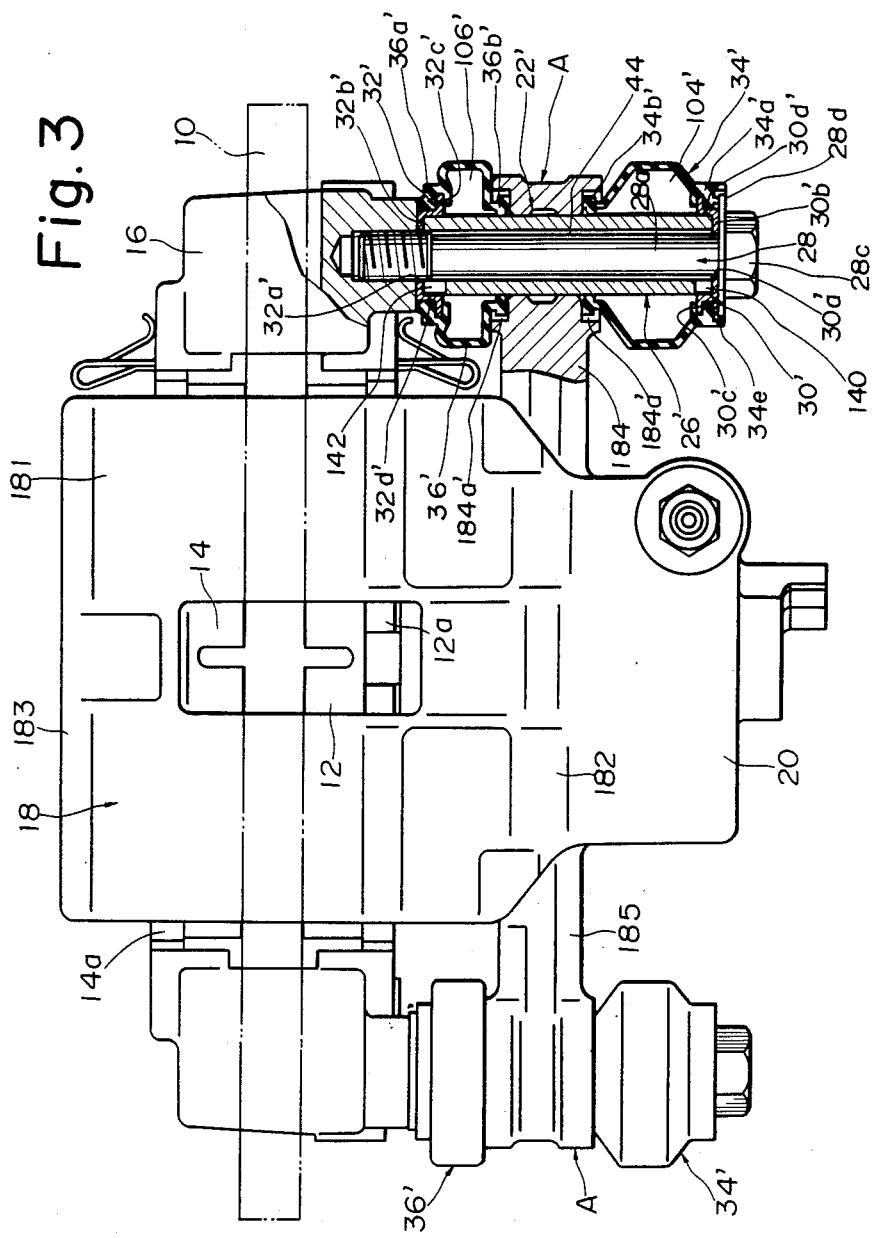

DISC BRAKE

BACKGROUND OF THE INVENTION

1. Field of the Invention

This invention relates generally to a disc brake for automotive vehicles and more particularly to a disc brake of the pin-guide type in which the sliding movement of a caliper is guided by guide pins.

2. Prior Art

In a pin-guide type disc brake, a caliper is mounted by a pair of guide pins on a mounting bracket for sliding movement along the guide pins relative to the mounting bracket, and the sliding portions are completely covered by elastic protective boots. Therefore, the pin-guide type disc brake is advantageous over a disc brake of the caliper-floating type in that the sliding portions are less affected by foreign matters such as muddy water and dirt.

Generally, each of the guide pins is slidably extended through a mounting arm of the caliper, and a pair of protective boots sealingly covers the opposite end portions of the guide pin extending from the mounting arm, with one end of the boots being engaged respectively in peripheral mounting grooves formed in the guide pin. This technique is disclosed in Japanese Utility Model Application Laid-Open (Kokai) Nos. 56-71536 and 55-63436 and Japanese Patent Application Laid-Open (Kokai) No. 57-157833.

The provision of the mounting grooves in the guide pin has lowered the strength thereof and made the shape complicated. In addition, the seal between the boot and the guide pin has not been satisfactory, so that foreign matters such as dirt tend to intrude into the sliding portions of the caliper. Particularly, as the caliper is slidingly moved along the guide pins, one of the pair of boots is compressed while the other is evacuated, and this produces a pumping action, so that dirt or the like tends to be drawn into the boots. In addition, such an action increases resistance to the movement of the caliper. For this reason, it is important to provide a positive seal between the boot and the guide pin. One solution to the problem of the pumping action has been proposed in Japanese Utility Model Publication (Kokai) No. 58-32026 in which a slit is formed in the sealing portion of each of the two boots so that the interiors of the two boots are communicated with each other through a gap between the area of sliding contact between the caliper and the guide pins. Generally, oily material such as grease is applied to such sliding contact area to facilitate the sliding movement, and such grease tends to close the slits to adversely affect the communication between the interiors of the two boots.

SUMMARY OF THE INVENTION

It is therefore an object of this invention to provide a disc brake of the type in which a positive seal is provided between the boot and the guide pin without lowering the strength of the guide pin.

According to the present invention, there is provided a disc brake for a vehicle having wheels and a body comprising:

(a) a disc rotatable with the wheels;

(b) a mounting bracket adapted to be mounted on the body of the vehicle;

(c) a pair of friction pads disposed on opposite sides of said disc and mounted on said mounting bracket so as to move toward each other;

(d) a caliper mounted on said mounting bracket for moving in an axial direction of said disc;

(e) means for moving said caliper relative to said mounting bracket so as to press said pair of friction pads against the opposite sides of said disc;

(f) guide means for guiding the movement of said caliper relative to said mounting bracket, said guide means comprising a tubular sleeve slidably extending through a guide hole formed through either said caliper or said mounting bracket in the axial direction of said disc, said guide means comprising a bolt received in and extending through said tubular sleeve and threaded into a threaded hole formed in a mounting surface of the other of said caliper or said mounting bracket, said bolt having a head, said sleeve being disposed between said bolt head and said mounting surface;

(g) a pair of first and second retainer rings mounted on said bolt, said first retainer ring being clamped between said bolt head and one end of said sleeve, said second retainer ring being clamped between said mounting surface and the other end of said sleeve; and (h) a pair of first and second tubular elastic boots respectively surrounding and covering the opposite end portions of said sleeve extending outwardly from said guide hole, thereby forming a pair of annular chambers each formed between the outer periphery of said sleeve and a respective one of said boots, one end of said first boot being secured to said first retainer ring while the other end is secured to either one of said caliper or said bracket at a portion thereof to which one end of said guide hole opens, one end of said second boot being secured to said second retainer ring while the other end is secured to either said caliper or said bracket at a portion thereof to which the other end of said guide hole opens, and said one ends of said first and second boots being elastically held in contact with said bolt head and said mounting surface.

BRIEF DESCRIPTION OF THE DRAWINGS

FIG. 1 is a partly-broken plan view of a disc brake provided in accordance with the present invention;

FIG. 2 is an enlarged fragmentary view of the disc brake;

FIG. 3 is a view similar to FIG. 1 but showing a modified disc brake; and

FIG. 4 is an enlarged fragmentary view of the disc brake of FIG. 3.

DESCRIPTION OF THE PREFERRED EMBODIMENTS OF THE INVENTION

The invention will now be described with reference to the drawings in which like reference numerals denote corresponding parts in several views.

A pin-guide disc brake shown in FIG. 1 comprises a disc 10 rotatable with a wheel of a vehicle (not shown), and a pair of friction pads 12 and 14 disposed on opposite sides of the disc 10 and secured respectively to backing plates 12a and 14a. The two backing plates 12a and 14a are mounted on a mounting bracket 16 for movement along an axis of the disc 10 so as to press the pair of friction pads against the disc 10, the mounting bracket 16 being secured to a stationary portion of the vehicle. The disc brake further comprises a caliper 18 mounted on the mounting bracket 16 as hereinafter more fully be described. The caliper 18 comprises a major portion 181 extending across the friction pads 12 and 14 and the disc 10, a pair of spaced leg portions 182 and 183 extending generally perpendicularly from the major portion 181, and a pair of arm portions 184 and 185 extending in opposite directions parallel to the plane of the disc 10. A hydraulic cylinder 20 is contained in the leg portion 182 and has a piston (not shown) which is held in contact with the backing plate 12a, and the other leg portion 183 is held in contact with the other backing plate 14a. Upon operation of a brake pedal or the like in the vehicle, the piston of the cylinder 20 presses the friction pad 12 against one side of the disc 10 via the backing plate 12a, and at the same time the caliper 18 is moved by a reaction to the thrusting action of the piston so as to press the friction pad 14 against the other side of the disc 10 via the backing plate 14a, thereby applying a braking action to the disc 10, as is well known in the art.

The movement of the caliper 18 is guided by a pair of pin assemblies A. The two pin assemblies 24 are mounted as at A on the pair of arm portions 184 and 185, respectively. Thus, the pin assemblies 24 are spaced a sufficient distance from each other in a direction perpendicular to the axis of the disc 10 to ensure that the caliper 18 is not inclined during the movement thereof. Each of the arm portions 184 and 185 has a guide hole 22 formed therethrough at its outer end and having an axis parallel to the axis of the disc 10, and each of the pin assembly 24 is slidably received in a respective one of the guide holes 22. The two pin assemblies 24 are of an identical construction and therefore only one of them will now be described for illustration purposes. Each pin assembly 24 comprises a tubular sleeve 26 slidably extending through the guide hole 22, and a bolt 28 passing through the tubular sleeve 26. The bolt 28 comprises a shank 28a and an enlarged head 28c formed on one end of the shank 28a. The shank 28a has an externally-threaded portion 28b on its end portion remote from the head 28c, and the threaded portion 28b extends outwardly from the guide hole 22 and is threaded into an internally-threaded hole 29 formed in a mounting surface 16a of the mounting bracket 16 facing the arm portion 184 (185). In this condition, the sleeve 26 is held between the mounting bracket 16 and the bolt head 28c. The bolt head 28c has a flange 28d immediately adjacent to the shank 28a.

A first retainer ring 30 is held between the bolt flange 28d and the outer end of the cylindrical sleeve 26, and a second retainer ring 32 is held between the inner end of the sleeve 26 and the mounting surface 16a of the mounting bracket 16. Each of the retainer rings 30 and 32 is made of a plate and is held in place by tightening the bolt 28. The bolt shank 28a passes through these rings 30 and 32. The opposite end portions of the sleeve 26 extending outwardly from the arm 184, 185 are surrounded by and covered by a pair of tubular boots 34 and 36 of an elastic material, respectively, so that each boot and the outer periphery of the sleeve 26 form an annular chamber or space 104, 106. One end 34a of the boot 34 is secured to the retainer ring 30 while the other end 34b is snugly fitted in and secured to an annular groove 184a (185a) formed in one side of the arm portion 184 facing the bolt flange 28d in encircling relation to the guide hole 22. On the other hand, one end 36a of the boot 36 is secured to the retainer ring 32 while the other end 36b is snugly fitted in and secured to another annular groove 184a (185a) formed in the other side of the arm portion 184 facing away from the bolt head 28c in encircling relation to the guide hole 22. Thus, the retainer rings 30 and 32 retain the ends 34a and 36a of the boots 34 and 36 and also serve to enhance a sealing effect of the boots 34 and 36.

The two retainer rings 30 and 32 are made of metal such as steel and spring steel and are generally similar in configuration. More specifically, each of the retainer rings 30 and 32 has a main disc portion 30b, 32b having a central aperture 30a, 32a formed therethrough, a boot-mounting portion 30c, 32c axially spaced a distance 1 from one surface of the disc portion 30b, 32b, and a tubular connective portion 30d, 32d interconnecting the disc portion 30b, 32b and the boot-mounting portion 30c, 32c, the bolt shank 28a passing through the central apertures 30a and 32a. The disc portion 30b of the retainer ring 30 is held between the outer end of the sleeve 26 and the bolt flange 28d while the disc portion 32b of the retainer ring 32 is held between the inner end of the sleeve 26 and the mounting surface 16a of the mounting bracket 16. The connective portions 30d and 32d are fitted around the sleeve 26. The boot-mounting portion 30c of the retainer ring 30 has a radial portion 30e extending radially outwardly from one end of the connective portion 30d, 32d remote from the disc portion 30b, 32b, and an axial portion 30f extending axially from the outer end of the radial portion. The retainer ring 32 differs from the retainer ring 30 only in that it has no such axial portion.

The thickened ends 34a and 36a of the boots 34 and 36 are secured to the boot-mounting portions 30c and 32c of the retainer rings 30 and 32, respectively. In other words, the boot-mounting portions 30c and 32c are fitted respectively in complementarily-shaped grooves formed in the thickened ends 34a and 36a. The thickened ends 34a and 36a have annular projections 34c and 36c at their end faces, respectively. In the normal condition, the annular projections 34c and 36c project respectively beyond the one faces of the disc portions 30b and 32b facing away from the sleeve 26. When the bolt 28 is tightened, the annular projections 34c and 36c are pressed against the bolt flange 28d and the mounting surface 16a of the mounting bracket 16 so that the projections are elastically deformed or compressed to enhance a sealing effect. Thus, the thickened ends 34a and 36a are fitted around and held in sealing engagement with the sleeve 26 and also are held in sealing engagement with the bolt flange 28d and the mounting surface 16a of the mounting bracket 16, thereby preventing foreign matters such as dirt from intruding into the area of the sliding contact between the outer peripheral surface of the sleeve 26 and the surface of the guide hole 22. Since the boots 34 and 36 are elastic, they are axially deformed when the caliper 18 is slidingly moved along the parallel sleeves 26.

The axial portion 30f of the retainer ring 30 enhances a seal between the outer peripheral surface of the sleeve 26 and the inner peripheral surface of the ends 34a, 36a of the boots 34 and 36. The retainer rings 30 and 32 may be of an identical configuration so as to reduce the kinds of the component parts. Also, in the illustrated embodiment, the bolts 28 are threadedly connected to the mounting bracket 16, the bolts 28 may be threadedly connected to the caliper 18 in which case the sleeves 26 are slidably mounted in the mounting bracket 16.

FIGS. 3 and 4 shows a modified form of the invention. The modified disc brake is generally similar in construction to the disc brake of FIGS. 1 and 2, and the differences will now be described. Two retainer rings 30' and 32' are of the same configuration and each is defined by a disc portion 30b', 32b', a radial boot-mounting portion 30c' and 32c', and a tubular connective portion 30d', 32d', interconnecting the disc portion 30b', 32b' and the boot-mounting portion 30c', 32c'. The bolt shank 28a extends through central apertures 30a', 32a' of the retainer rings 30', 32' as described above for the preceding embodiment. The diameter of the disc portion 30b', 32b' is slightly greater than the diameter of a sleeve 26', so that the tubular connective portion 30d', 32d' is spaced from the outer periphery of the sleeve 26' to form an annular space 100, 102 therebetween.

A pair of annular grooves 184a' are formed in the opposite sides of the arm portion 184 (185) of the caliper 18 in contiguous relation to a guide hole 22' through which the sleeve 26' slidably extends. One end 34a' of the boot 34' is secured to the boot-mounting portion 30c' of the retainer ring 30' while the other end 34b' is snugly fitted in and secured to the annular groove 184a' facing the bolt flange 28d and is held in contact with the outer peripheral surface of the sleeve 26'. On the other hand, one end 36a' of the boot 36' is secured to the boot-mounting portion 32c' of the retainer ring 32' while the other end 36b' is snugly fitted in and secured to another annular groove 184a facing away from the bolt head 28c and is held in contact with the outer peripheral surface of the sleeve 26'. The boot 34' differs from the boot 36' only in that the former has a skirt portion 34e surrounding the bolt flange 28d, but the skirt portion 34e may be omitted.

A first transverse port 140 is formed transversely through the sleeve 26' at one end thereof held against the retainer ring 30', and a second transverse port 142 is also formed transversely through the sleeve 26' at the other end thereof held against the retainer ring 32'. Each of these ports 140 and 142 are in the form of a notch formed in the end of the sleeve 26' but may be in the form of an aperture formed through the sleeve 26' and slightly spaced in the sleeve end. With this arrangement, the annular chamber 104' defined by the boot 34' and the outer periphery of the sleeve 26' is communicated with the annular chamber 106' defined by the boot 36' and the outer periphery of the sleeve 26' via the annular space 100, a gap 44 between the inner peripheral surface of the sleeve 26' and the outer peripheral surface of the bolt shank 28a and the annular space 102. Since the ports 140 and 142 are formed through the sleeve 26', the communication between the annular chambers 104' and 106' is ensured. Thus, in this embodiment, since the annular chambers 104' and 106' are communicated with each other, a pumping action as described above is not encountered.

What is claimed is:

1. A disc brake for a vehicle having wheels and a body comprising:
   (a) a disc rotatable with the wheels;
   (b) a mounting bracket adapted to be mounted on the body of the vehicle;
   (c) a pair of friction pads disposed on opposite sides of said disc and mounted on said mounting bracket so as to move toward each other;
   (d) a caliper mounted on said mounting bracket for moving in an axial direction of said disc;
   (e) means for moving said caliper relative to said mounting bracket so as to press said pair of friction pads against the opposite sides of said disc;
   (f) guide means for guiding the movement of said caliper relative to said mounting bracket, said guide means comprising a tubular sleeve slidably extending through a guide hole formed through said caliper in the axial direciton of said disc, said guide means comprising a bolt received in and extending through said tubular sleeve and threaded into a threaded hole formed in a mounting surface of said mounting bracket, said bolt having a head, said sleeve being disposed between said bolt head and said mounting surface;
   (g) a pair of first and second retainer rings mounted on said bolt, said first retainer ring being clamped between said bolt head and one end of said sleeve, said second retainer ring being clamped between said mounting surface and the other end of said sleeve; and
   (h) a pair of first and second tubular elastic boots respectively surrounding and covering the opposite end portions of said sleeve extending outwardly from said guide hole, thereby forming a pair of annular chambers each formed between the outer periphery of said sleeve and a respective one of said boots, one end of said first boot being secured to said first retainer ring while the other end is secured to said caliper at a portion thereof to which one end of said guide hole opens, one end of said second boot being secured to said second retainer ring while the other end is secured to said caliper at a portion thereof to which the other end of said guide hole opens, and said one ends of said first and second boots which are respectively secured to said caliper being elastically held in contact with said bolt head and said mounting surface in which each of said first and second retainer rings has a disc portion held against a respective one of the opposite ends of said sleeve, and a boot-mounting portion disposed around said sleeve, and a tubular connective portion disposed around said sleeve and interconnecting said disc portion and said boot-mounting portion, and said bolt extending through said disc portion and in which each of said boots has and end with grooves in which one of said boot-mounting portions of one of said first and second retainer rings is inserted.

2. A disc brake according to claim 1, further comprising a second guide means, a second pair of first and second retainer rings, and a second pair of first and second tubular elastic boots which are similar in construction to said first-mentioned guide means, retainer rings and the elastic boots, said sleeve of said first-mentioned guide means being spaced from the sleeve of said second guide means in a direction perpendicular to the axis of said disc.

3. A disc brake according to claim 1, in which said boot-mounting portion is defined by a radial portion extending radially outwardly from said connecting portion.

4. A disc brake according to claim 3, in which said bolt head has a peripheral flange, part of the one end of said first boot being held between said peripheral flange and said radial portion.

5. A disc brake according to claim 1, in which a gap is formed between an inner peripheral surface of said sleeve and an outer peripheral surface of said bolt, a pair of transverse ports being formed in said sleeve at opposite ends thereof and extending transversely of said sleeve so as to communicate said annular chambers to said gap via said ports, thereby communicating said pair of annular chambers with each other.

6. A disc brake according to claim 5, in which each of said ports is in the form of a notch formed in said sleeve at the end thereof.

7. A disc brake according to claim 1 in which each of said first and second tubular relastic boots has a projection which, when said bolt is tightened, is elastically deformed or compressed to provide an enhanced sealing effect.

* * * * *